(12) United States Patent
Saczalski et al.

(10) Patent No.: US 6,626,462 B2
(45) Date of Patent: Sep. 30, 2003

(54) VEHICLE OCCUPANT SAFETY NET

(76) Inventors: Todd K. Saczalski, 55 Concho Way, Sedona, AZ (US) 86351; Kenneth J. Saczalski, 1440 W. Bay Ave., Newport Beach, CA (US) 92661

( * ) Notice: Subject to any disclaimer, the term of this patent is extended or adjusted under 35 U.S.C. 154(b) by 0 days.

(21) Appl. No.: 10/147,793

(22) Filed: May 17, 2002

(65) Prior Publication Data

US 2002/0180197 A1 Dec. 5, 2002

Related U.S. Application Data

(63) Continuation of application No. 10/042,628, filed on Jan. 9, 2002, now abandoned, which is a continuation of application No. 09/572,355, filed on May 17, 2000, now abandoned.

(51) Int. Cl.[7] .................. B60R 21/06; B62D 33/04; B60J 1/00
(52) U.S. Cl. .................. 280/749; 296/24.1; 296/85
(58) Field of Search ................ 280/749, 748; 296/24.1, 85

(56) References Cited

U.S. PATENT DOCUMENTS

| | | |
|---|---|---|
| 2,706,819 A | 4/1955 | McClure |
| 3,049,373 A | 8/1962 | Biggers |
| 3,169,781 A | 2/1965 | Abruzzino |
| 3,172,702 A | 3/1965 | Rose |
| 3,423,121 A | 1/1969 | Lipkin |
| 3,443,824 A | 5/1969 | Dietrich |
| 3,525,535 A | 8/1970 | Kobori |
| 3,633,936 A | 1/1972 | Huber |
| 3,643,972 A | 2/1972 | Caiati et al. |
| 3,666,313 A | 5/1972 | Halstead et al. |
| 3,837,422 A | 9/1974 | Schlanger |
| 4,592,571 A | 6/1986 | Baumann et al. |
| 4,621,856 A | 11/1986 | Mckenzie |
| 4,924,814 A | 5/1990 | Beaudet |
| 4,986,389 A | 1/1991 | Halligan, Sr. et al. |
| 5,121,958 A | 6/1992 | Goeden et al. |
| 5,401,072 A | 3/1995 | Farrand |
| 5,437,474 A | 8/1995 | Ament |
| 5,529,341 A | 6/1996 | Hartigan |
| 5,820,187 A | 10/1998 | Ament et al. |
| 5,839,757 A | 11/1998 | von Lange et al. |
| 5,848,665 A | 12/1998 | Rexroad et al. |
| 5,876,064 A | 3/1999 | Ament et al. |
| 5,879,048 A | 3/1999 | Tower |
| 5,971,433 A | 10/1999 | Ament et al. |
| 6,099,222 A | 8/2000 | Moore |

FOREIGN PATENT DOCUMENTS

| | | |
|---|---|---|
| DE | 4128702 A1 | 3/1992 |
| DE | 4239471 A1 | 5/1994 |
| EP | 0642995 A1 | 8/1994 |
| GB | 2135639 A | 9/1984 |

OTHER PUBLICATIONS

K. Saczalski, "Belt Integrated Vehicular Seat Rear Impact Studies", Paper No. F2000G279, Seoul 2000 FISITA World Automotive Congress, Jun. 12–15, 2000, Seoul, Korea.

(List continued on next page.)

Primary Examiner—Paul N. Dickson
Assistant Examiner—Joselynn Y. Sliteris
(74) Attorney, Agent, or Firm—Stetina Brunda Garred & Brucker

(57) ABSTRACT

A method of preventing at least one front seat of a vehicle from collapsing into a rear seat area during rear impact collisions with a vehicle occupant safety net thereby mitigating whiplash injuries to front seat occupants and reducing potential injuries to rear seat occupants. The method provides for positioning the vehicle occupant safety net between the at least one front seat and the rear seat area of the vehicle. The safety net is then secured to the vehicle. Moreover, the safety net is sized and configured to prevent the at least one front seat from collapsing rearwardly into the rear seat area during rear impact collisions thereof to mitigate whiplash injuries to the front seat occupants and reduce potential injuries to the rear seat occupants.

17 Claims, 3 Drawing Sheets

OTHER PUBLICATIONS

K. Saczalski, "Evaluation of Rear Impact Seat System Performance Using a Combined Load Neck Injury Criteria and Hybrid III Surrogates", IMECE2001/AMD–25444, 2001 ASME Int'l Mechanical Engineering Congress and Exposition, Nov. 11–16, 2001, New York, New York.

K. Saczalski, "Study of Seat System Performance RElated to Injury of Rear Seated Children & Infants in Rear Impacts", IMECE2002–33517, ASME Int'l Mechanical Engineering Congress & Exposition, Nov. 17–22, 2002, New Orleans, Louisiana.

VEHICLE OCCUPANT SAFETY NET

CROSS-REFERENCE TO RELATED APPLICATIONS

This application is a continuation of U.S. patent application Ser. No. 10/042,628, filed Jan. 9, 2002 now abandoned, which is a continuation of U.S. patent application Ser. No. 09/572,355, filed May 17, 2000, now abandoned.

BACKGROUND OF THE INVENTION

The present invention generally relates to a method and an apparatus for preventing injuries to occupants in a vehicle, and more particularly to an improved method and apparatus for preventing at least one front seat of a vehicle from collapsing into a rear seat area during collisions with a vehicle occupant safety net thereby mitigating whiplash injuries to occupants.

The use of safety devices in vehicles in order to increase safety measures to occupants therein are well known. Such safety measures have been primarily designed to mitigate injuries to the occupants during vehicle collisions, or even sudden stops. The transportation industry, mainly comprised of automobile, railroad, airline, and sea vessel businesses, has realized over time that such potential risks to their occupants may have dire consequences in incidents immediately mentioned above. Therefore, as a response to such circumstances, the transportation industry has spent enormous financial resources and time in a constant effort to improve their safety measures to minimize injuries to their occupants.

For example, safety belts are widely utilized in the transportation industry to improve safety measures to the occupants. More specifically, the safety belts maintain the occupants on the seats of the vehicles in order to prevent any outward projections of the occupants during vehicle collisions or sudden stops. The safety belts have been effective in mitigating injuries by preventing the occupants from colliding with the interior of the vehicle, or being thrown out therefrom. However, even though the safety belts may be effective in the above context, such belts are not a solution to the problem stated below.

More specifically, during most rear impacts of vehicles, namely, automobiles, the vehicle seats may collapse rearwardly at fairly low load levels and impact speeds. Upon encountering the collapse of such seats, many problems may result therefrom. For instance, when the front driving seat collapses, the driver may fall away from the vehicle controls, brakes, steering, etc., which makes it difficult to avoid subsequent accident possibilities.

Furthermore, falling rearward as the seat collapses flat may cause the occupant of the seat to slide out from the seat belt, thus allowing the occupant to hit his or her head on other portions of the interior of the vehicle. Moreover, in extreme cases, such phenomenon may cause the occupant to be ejected from the vehicle. Additionally, with the recent advice that all infants should be placed in infant seats located in the rear seats, the collapse of the front seats may cause damage to the infant maintained in the infant seat. Even further, the rearward collapse of the front seats may additionally make it difficult to extricate passengers from the rear seat area of the vehicle following collisions.

Thus, there has long been a need in the industry, and in the transportation industry in particular, for a method and an apparatus for preventing the front seats of the vehicle from collapsing into the rear seat area during vehicle collisions. In particular, there is a need to prevent such collapses in order to better resolve not only the problems stated above, but also to further mitigate whiplash injuries to the occupants of the vehicle.

The present invention addresses and overcomes the above-described deficiency of conventional vehicle seats by positioning a vehicle occupant safety net between the front seats and the rear seat area of the vehicle. Moreover, the vehicle occupant safety net is strategically secured to the vehicle in order to prevent rearward collapse of the seats thereby mitigating injuries to the occupants, namely, reducing head and neck rearward extensions which may result in whiplash motion. In addition, the safety net also prevents such collapsing of the seats into the rear seat area where the occupants, such as infants and children, may be seated. Furthermore, the vehicle occupant safety net is user-friendly to the occupants by being retractable within a net roller when its use is not desired.

BRIEF SUMMARY OF THE INVENTION

In accordance with the present invention, there is provided a method of preventing at least one front seat of a vehicle from collapsing into a rear seat area during collisions with a vehicle occupant safety net thereby mitigating whiplash injuries to occupants. The method provides for positioning the vehicle occupant safety net between the at least one front seat and the rear seat area of the vehicle. The safety net is then secured to the vehicle. Moreover, the safety net is sized and configured to prevent the at least one front seat from collapsing rearwardly into the rear seat area during collisions thereof to mitigate whiplash injuries of the occupants.

More specifically, the safety net further comprises a net roller. The safety net may be advanceable through the net roller to be retracted therein. Furthermore, the safety net may be pullable from the net roller to extend therefrom. Such safety net may be fabricated from a lightweight, high-strength unitary material.

In addition, a body of the vehicle comprises the at least one front seat having a backside. In one embodiment, safety net may be positioned to extend generally parallel to the backside of the at least one front seat. In another embodiment, the safety net may be positioned to extend in abutting contact the backside of the at least one front seat. Furthermore, the vehicle may be an automobile.

In accordance with the present invention, the safety net has a first longitudinal edge, in which the first edge may be attached to an upper portion of a support structure of the vehicle body. The support structure of the vehicle body may be a roll bar mounted therein, in which the roll bar may be positioned between the at least one front seat and the rear seat area. Moreover, the first edge may be slidably engaged to the net roller, wherein the net roller may be attachable to the upper portion of the support structure.

Furthermore, the safety net has a second longitudinal edge, in which the second edge may be attached to side portions of the support structure. More specifically, a first strap with a snap and a second strap with a ring may attach the second edge to the side portions of the support structure. The first strap and the second strap may each connect around the side portions opposite from each other, wherein the first strap may engage across the second edge to interlock the snap with the ring of the second strap.

The second longitudinal edge may further be attached to a lower structure of the vehicle body. Such lower structure may be a floor of the vehicle. In particular, the second edge has at least one endpiece therealong, wherein the at least one endpiece may be extendable from the second edge for attachment to the lower structure of the vehicle.

Moreover, the at least one endpiece may extend from ends of the second edge for attachment to the lower structure of the vehicle, wherein the at least one endpiece is generally perpendicular to the second edge. A releasable hook and a bolt may attach the at least one endpiece to the lower structure. Specifically, the releasable hook may be attached on an exposed end of the at least one endpiece for engagement to the bolt mounted on the lower structure of the vehicle.

BRIEF DESCRIPTION OF THE DRAWINGS

These as well as other features of the present invention, will become more apparent upon reference to the drawings wherein.

DETAILED DESCRIPTION OF THE INVENTION

Figure 1:
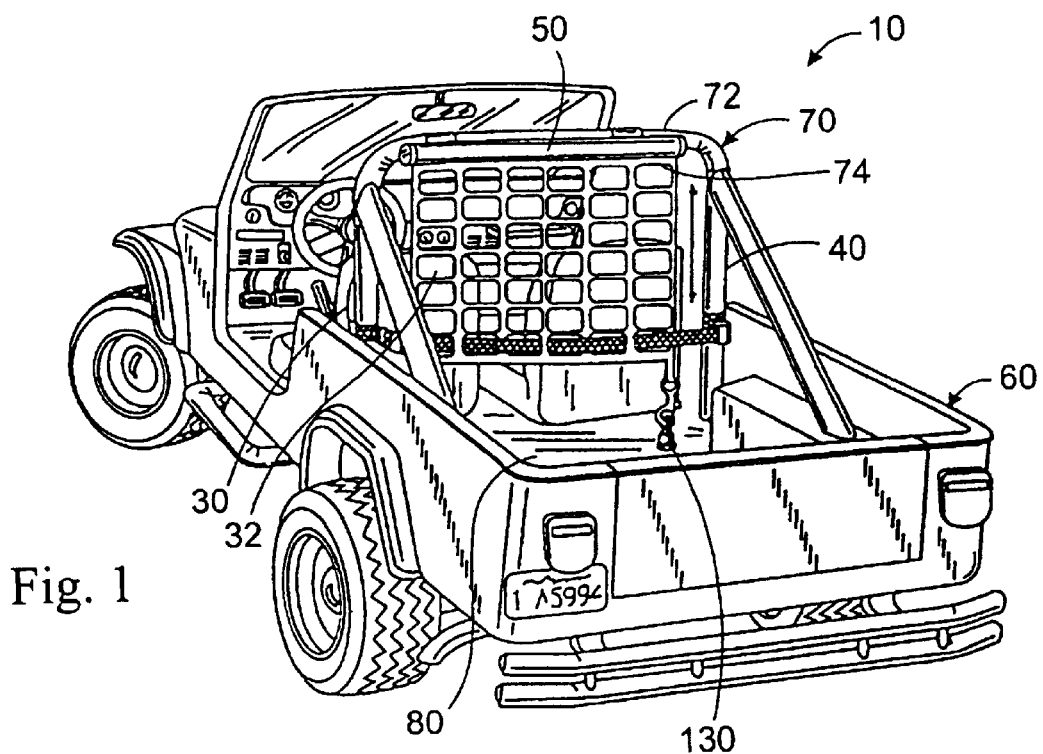
FIG. 1 is a perspective view of a vehicle with a vehicle occupant safety net constructed in accordance with a preferred embodiment of the present invention.
Figure 1A:
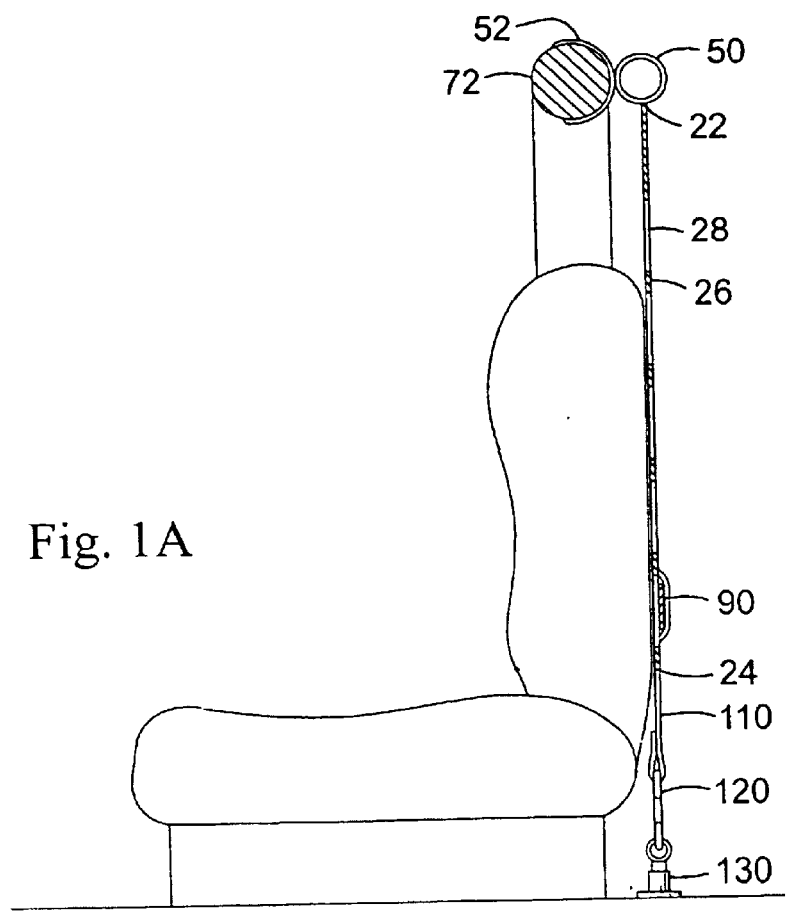
FIG. 1A is a side view of the vehicle seat and safety net shown in FIG. 1.
Figure 2:
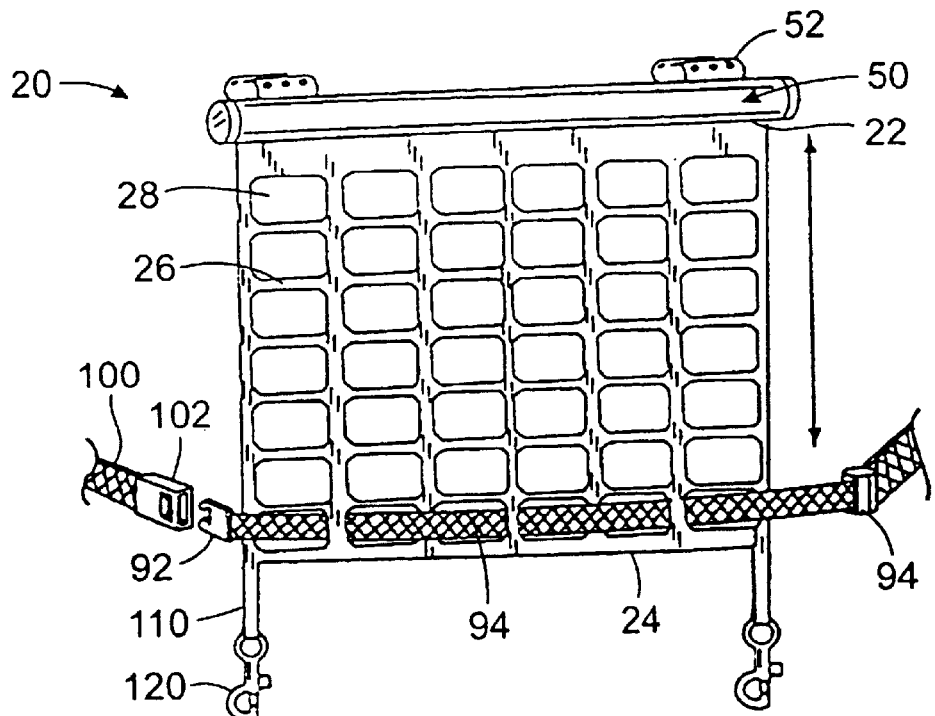
FIG. 2 is an elevational view of the safety net shown in FIG. 1.
Figure 3:
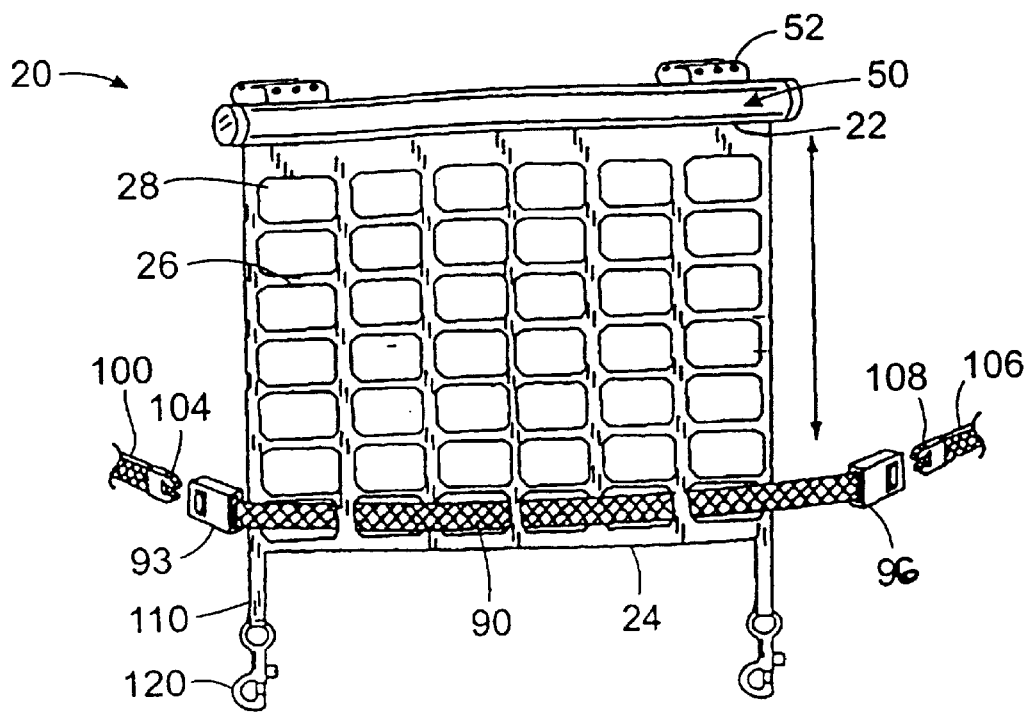
FIG. 3 is an elevational view of the safety net with an alternative way of attachment to the vehicle shown in FIG. 1.
Figure 4:
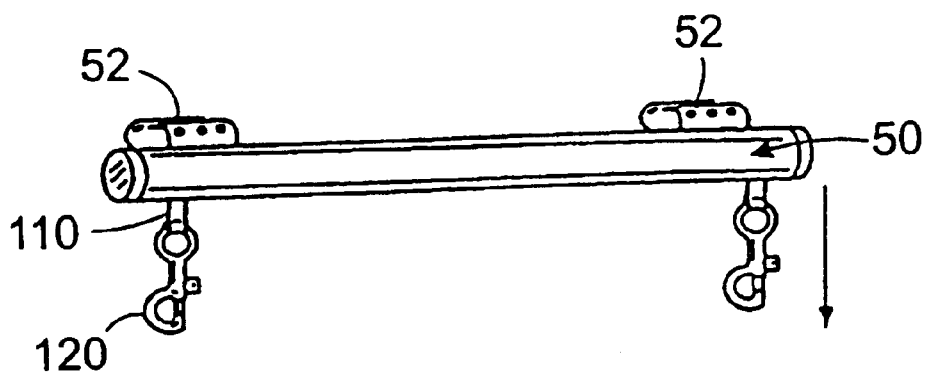
FIG. 4 is an elevational view of a net roller with the safety net partially retracted therein.

Referring now to the drawings wherein the showings are for purposes of illustrating preferred embodiments of the present invention only, and not for, purposes of limiting the same, FIG. 1 perspectively illustrates a vehicle 10 with a vehicle occupant safety net 20 constructed in accordance with a preferred embodiment of the present invention. In this regard, the vehicle 10 may be any variety of vehicles, such as an automobile, a boat, an airplane, a train, or any type of transportable body. It is important to note that the automobile in FIG. 1 is only a structure of the vehicle, the at least one endpiece being generally perpendicular to the second edge. symbolic representation of the vehicle 10, and the application of the present invention should not solely be limited to thereof. It will be appreciated by those of ordinary skill in the art that the present invention may be applicable to any vehicle 10, as will be explained more fully below.

Referring now to FIGS. 1, 1A, 2, 3 and 4, the safety net 20 may be fabricated from any types of material, but a lightweight, high-strength unitary material is preferred. More specifically, it may be advantageous for the safety net 20 to be fabricated from high-strength material in order to better ensure prevention of rearward collapses of front seats 30 into a rear seat area 40. In this regard, the unitary characteristic of the safety net 20 may enhance the prevention of such collapses since the unitarily fabricated safety net 20 may not readily avail itself to tearing and/or any form of internal breach. Thus, the unitarily fabricated safety net 20 may provide additional strength to prevent the front seats 30 from collapsing rearwardly into the rear seat area 40.

Moreover, the safety net 20 is defined by a first longitudinal edge 22 and a second longitudinal edge 24. More specifically, the first longitudinal edge 22 is generally in parallel relationship with the second longitudinal edge 24. Furthermore, the first longitudinal edge 22 and the second longitudinal edge 24 are spaced apart, wherein a netting 26 of the safety net 20 is placed therebetween. The netting 26 further has uniformly distributed apertures 28 therethrough, as the apertures 28 are spread vertically and horizontally throughout the netting 26 in an ordered configuration. However, it will be contemplated by those of ordinary skill in the art that such configuration may be dependent upon the desires of a manufacturer, a driver, or an occupant of the vehicle 10, and therefore should not solely be limited to the configuration depicted in FIGS. 1–3.

In addition, the safety net 20 further comprises a net roller 50. The net roller 50 and the safety net 20 are slidably engaged to each other. More specifically, The net roller 50 is attached to the first longitudinal edge 22 of the safety net 20. The net roller 50 and the first longitudinal edge 22 are slidably engaged to each other, wherein the safety net 20 may be movable with respect to the net roller 50. The net roller 50 and the first longitudinal edge 22 may be engaged to each other in any fashion, whether it be conventional or in creative manner. For example, a bond or a sewing procedure may be utilized to attach the net roller 50 and the first longitudinal edge 22. In the alternative, the net roller 50 may mechanically grasp onto the first longitudinal edge 22 for the same purpose. Simply put, there are a plurality of ways in which the first longitudinal edge 22 may be engaged to the net roller 50.

Furthermore, as stated in the above paragraph, the safety net 20 may be slidably movable with respect to the net roller 50. The safety net 20 may advance through the net roller 50. Specifically, the safety net 20 may be wrapped around the outside of the net roller 50 when its use is not desired. In the alternative, the safety net 20 may further be advanceable through the inside of the net roller 50 to be retracted therein. Simply put, the safety net 20 may be rolled up within the net roller 50 when its use is not desired. It will be contemplated by those of ordinary skill in the art that any conventional methods may be utilized in retracting the safety net 20 within the net roller 50. For instance, a turn knob method may be used to manually wind up the safety net 20 within the net roller 50. Moreover, the safety net 20 may be triggered towards the net roller 50 simply by a mechanical arrangement that releases a piece that grips the safety net 20 in place. In addition, it may be appreciated by those of ordinary skill in the art that the safety net 20 may be applicable with a device utilized for a window shade or the like, and a locking retractor, such as safety belt. It should be noted that a variety of methods may be used in performing this function.

Consistent with the above paragraph, it should further be mentioned that the safety net 20 may be extendable from the net roller 50. More specifically, the safety net 20 may be pullable from the net roller 50 to extend therefrom. As stated above, there are a plurality of ways of doing this. For one, the turn knob method may be used to manually wind down the safety net 20 from the net roller 50 to a desired extension/position. Alternatively, the mechanical gripping piece arrangement may be used, wherein the gripping piece may hold the safety net 20 in place when the desired extension/position is reached. Even further, if the safety net 20 is simply wrapped around the outside of the net roller 50, then the safety net 20 may be manually unwrapped to its desired extension/position.

The vehicle 10 comprises a vehicle body 60. The vehicle body 60 is defined by the front seats 30, the rear seat area 40, a support structure 70, and a lower structure 80. More specifically, the front seats 30 of the vehicle body 60 has respective backsides 32. Furthermore, the support structure 70 is mounted to the lower structure 80 of the vehicle body 60. The support structure 70 of the vehicle body 60 may be a roll bar, B-pillars having roof ribs, C-pillars, or the like. Additionally, the lower structure 80 may be a floor of the vehicle body 60.

The safety net 20 may be positioned between the backsides 32 of the front seats 30 and the rear seat area 40 of the vehicle body 60. The safety net 20 may be positioned to extend generally parallel to the backsides 32 of the front seats 30. Moreover, the safety net 20 may further be positioned to extend in abutting contact the backside 32 of the front seats 30. Simply put, as long as the safety net 20 is able to prevent the front seats 30 from collapsing rearwardly into the rear seat area 40, there is no specific place where the safety net 20 should be placed. However, for ease of attachment purposes, it is recommended that the safety net 20 be placed generally in proximity to the support structure 70 and the backsides 32 of the front seats 30.

Furthermore, it may be important to place the safety net 20 in such a way that it covers the entirety of the backsides 32 of the front seats 30. It should be noted that the safety net 20 may simply extend to cover only partial area of the backsides 32. However, in order to increase the effectiveness of the safety net 20, it is recommended that the safety net 20 be utilized in a way that it extends over the entirety of the backsides 32 of the front seats 30, including head restraints, if any. This way, not only does the safety net 20 prevent the front seats 30 from collapsing into the rear seat area 40, but simultaneously prevents any whiplash injuries of occupants as well by maintaining the front seats 30, including the head restraints, in an upright position as possible during collisions. Furthermore, it may be beneficial to allow the front seats 30 to be movable in its normal context by having the safety net 20 to be adjustable to accommodate such movement, wherein the safety net 20 may be locked in place after the desired position of the front seats 30 are reached.

In addition, the safety net 20 may further need to be secured to the vehicle 10, namely, the vehicle body 60. The support structure 70 comprises an upper portion 72 and opposing side portions 74. The first longitudinal edge 22 of the safety net 20 may be attached to the upper portion 72 of the support structure 70. More specifically, the first longitudinal edge 22 is attached to the net roller 50, in which the net roller 50 may be attached to the upper portion 72 of the support structure 70. The net roller 50 comprises grasping members 52 which may mechanically attach to the upper portion 72. The grasping members 52 may be adjustable to conform to the different thicknesses of the upper portion 72, in which subsequent tightening may be applied. Alternatively, the first longitudinal edge 22 may directly attach to the upper portion 72 by a conventional sewing or bonding procedure.

The safety net 20 may further need to be secured to the side portions 74 of the support structure 70. It will be contemplated by those of ordinary skill in the art that the safety net 20 may be attached to the side portions 74 in any manner, such as simply tying the safety net 20 to the side portions 74 with suitable ropes, cables, cords or the like. However, a first strap 90 with a ring 92 and a second strap 100 with a snap 102 may be utilized to secure the safety net 20 to the side portions 74. More specifically, the first strap 90 may be looped around one of the side portions 74, as the second strap 100 may also be looped around the opposing side portion 74.

The first strap 90 or the second strap 100 may engage the second longitudinal edge 24 of the safety net 20, or some intermediate parallel edge. For instance, the first strap 90 may run across the length of the second longitudinal edge 24 to connect to the second strap 100. More specifically, the first strap 90 may run through every aperture 28 in closest proximity to the second longitudinal edge 24 of the safety net 20 in order to better secure the safety net 20 to the side portions 74. Thereafter, the ring 92 of the first strap 90 may interlock with the snap 102 of the second strap 100.

The first strap 90 may further comprise a belt retractor 96. More specifically, the belt retractor 96 may be formed anywhere along the first strap 90, but it is preferred that the belt retractor 96 be placed near any of one of the ends of the first strap 90. The belt retractor 96 may roll up the first strap 90 sidewardly, wherein the first strap 90 is slidably movable in relation to the belt retractor 96. The belt retractor 96 may further allow the first strap 90 to be pulled out to any length necessary, and lock the first strap 90 in place thereafter, to permit the front seats 30 to be adjustable to its desired position. Simply put, the belt retractor 96 may function to adjust the first strap 90 to the desired length.

In the alternative, the safety net 20 of the present invention may be attached to the side portions 74 in a different way than above. More specifically, the first strap 90 may comprise strap snaps 93 on its respective ends rather than having a ring 92. The second strap 100 is secured to one of the side portions 74, as a third strap 106 is engaged to the opposite thereof. The second strap 100 may have a second ring 104 in lieu of the snap 102, as the third strap 106 has a third ring 108. Thereafter, the first strap 90 may run through the second longitudinal edge 24 of the safety net 20, or through some intermediate parallel edge of the safety net 20, to interlock the strap snaps 93 with the respective second ring 104 of the second strap 100 and the third ring 108 of the third strap 106.

Moreover, the safety net 20 may further need to be secured to the lower structure 80 of the vehicle body 60. The second longitudinal edge 24 of the safety net 20 comprises endpieces 110. The endpieces 110 may be unitarily formed with the safety net 20 or attached in any conventional manner to the safety net 20. However, it is recommended that the endpieces 110 be unitarily formed with the safety net 20. In addition, the endpieces 110 are generally attached on the ends of the second longitudinal edge 24 to extend therefrom, and are generally perpendicular to the second longitudinal edge 24.

Figure 5:
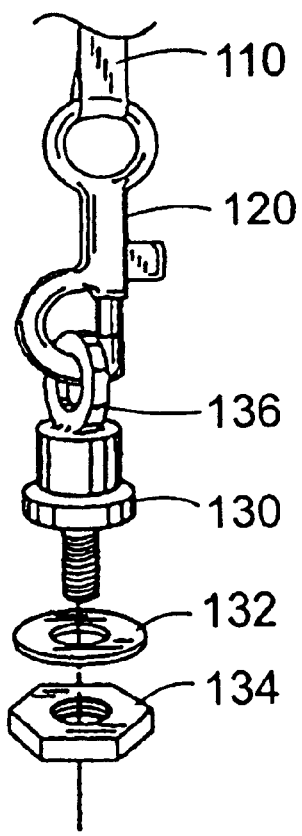
FIG. 5 is an exploded view of a releasable hook and a bolt of the safety net shown in FIG. 1.
Figure 6:
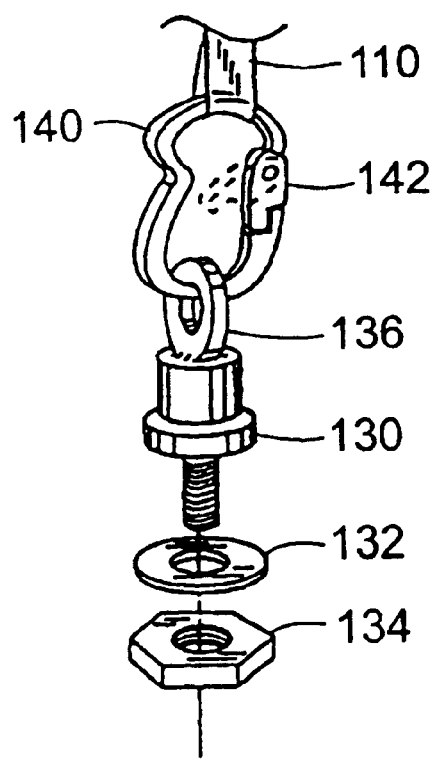
FIG. 6 is an exploded view of a releasable clip and a bolt of the safety net shown in FIG. 1.

Referring now to FIGS. 5 and 6, the endpieces 110 are utilized to attach the second longitudinal edge 24 to the lower structure 80 of the vehicle body 60. A releasable hook 120 and a bolt 130 may be used for such purpose. More specifically, the releasable hook 120 is attached on exposed ends of the endpieces 110, wherein the bolt 130 is engaged to the lower structure 80. The exposed ends of the endpieces 110 may attach the releasable hook 120 in any manner, but sewing the exposed ends of the endpieces 110 to the releasable hook is preferred. In addition, a circular nut 132 and a cylindrical nut 134 may be placed between the bolt 130 and the lower structure 80. The releasable hook 120 may engage a circular part 136 of the bolt 130 in order to secure the safety net 20 to the lower structure 80. Moreover, it may be contemplated by those of ordinary skill in the art that a shoulder of the bolt 130 may also spread the loads over a wider area of the lower structure 80 and may further eliminate pulling out of the circular part 136 of the bolt 130.

In the alternative, a releasable clip 140 may be utilized in place of the releasable hook 120. The releasable clip 140 may be attached on the exposed ends of the endpieces 110. The releasable clip 140 further comprises a movable clip piece 142, wherein the clip piece 142 may be operated via a spring or the like. Like the releasable hook 120, the clip 140 may engage the circular part 136 of the bolt 130 by the way of the movable clip piece 142 in order to secure the safety net 20 to the lower structure 80.

It may be important to note that the safety net 20 of the present invention may be installed in the vehicle 10 prior to its sale in the marketplace, or retrofitted in the vehicle 10 after its purchase. In the case of the safety net 20 being already installed in the vehicle 10 prior to its exposure in the marketplace, manufacturers of such vehicle 10 would carry out the task of installation. In the alternative, the safety net 20 may be purchased separately and subsequently retrofitted to the vehicle 10.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method of preventing at least one front seat of a vehicle from collapsing into a rear seat area during collisions with a vehicle occupant safety net thereby mitigating whiplash injuries to occupants, the method comprising the steps of:

(a) positioning the vehicle occupant safety net to extend in abutting contact with a backside of the at least one front seat between the at least one front seat and the rear seat area of the vehicle, the positioning of the vehicle occupant safety net not detracting from adjustability of the front seats of the vehicle;

(b) attaching a first longitudinal edge of the safety net to an upper portion of a support structure of the vehicle; and (c) attaching a second longitudinal edge to side portions of the support structure, a first strap with a ring and a second strap with a snap attaching the second longitudinal edge to the side portions of the support structure, the first strap and the second strap each being connected around side portions opposite from each other, wherein the first strap engages across the second edge to interlock the ring with the snap of the second strap;

wherein the safety net is sized and configured to prevent the at least one front seat from collapsing rearwardly into the rear seat area during collisions thereof to mitigate whiplash injuries of the occupants.

2. The method of claim 1 wherein the safety net further comprises a net roller, the safety net being advanceable through the net roller to be retracted therein.

3. The method of claim 1 wherein the safety net further comprises a net roller, the safety net being pullable from the net roller to extend therefrom.

4. The method of claim 1 wherein the safety net is fabricated from a lightweight, high-strength unitary material.

5. The method of claim 1 wherein the at least one front seat has a backside, and step (a) comprises positioning the safety net to extend generally parallel to the backside of the at least one front seat.

6. The method of claim 1 wherein the vehicle is an automobile.

7. The method of claim 1 wherein the support structure of the vehicle is a roll bar.

8. The method of claim 1 wherein the first edge is slidably engaged to a net roller, the net roller being attachable to the upper portion of the support structure.

9. The method of claim 1 wherein step (c) further comprises attaching the second longitudinal edge to a lower structure of the vehicle.

10. The method of claim 9 wherein the lower structure of the vehicle is a floor of the vehicle.

11. The method of claim 9 wherein the second edge has at least one endpiece therealong, the at least one endpiece being extendable from the second edge for attachment to the lower structure of the vehicle.

12. The method of claim 11 wherein the at least one endpiece extends from ends of the second edge for attachment to the lower structure of the vehicle, the at least one endpiece being generally perpendicular to the second edge.

13. The method of claim 11 wherein a releasable hook and a bolt attaches the at least one endpiece to the lower structure, the releasable hook being attached on an exposed end of the at least one endpiece for engagement to the bolt mounted on the lower structure of the vehicle.

14. A vehicle with a retractable vehicle occupant safety net for preventing front seats therein from collapsing rearwardly into a rear seat area thereof during collisions thereby mitigating whiplash injuries of occupants, the vehicle comprising:

(a) a vehicle body having a floor with the front seats and the rear seat area thereupon;

(b) the vehicle body further having a roll bar mounted to the floor, the roll bar being defined by an upper portion and side portions, the roll bar being positioned between the front seats and the rear seat area;

(c) a net roller with a retractable vehicle occupant safety net extending therefrom, the net roller being attachable to the upper portion of the roll bar, the safety net being positionable to extend in abutting contact with the backside of the front seats and attachable to the side portions of the roll bar and the floor of the vehicle body, wherein the safety net prevents the front seats from collapsing rearwardly into the rear seat area thereof during collisions thereby mitigating whiplash injuries of the occupants thereupon; and (d) a first strap with a ring and a second strap with a snap each being connected around the side portions opposite from each other, wherein the first strap engages across the safety net to interlock the ring with the snap of the second strap.

15. The vehicle as set forth in claim 14 wherein the safety net further comprises a releasable hook and a bolt, the releasable hook being attached to the safety net, the releasable hook being engageable to the bolt mounted on the floor.

16. The method of claim 1 wherein the first strap includes a belt retractor configured to adjust the first strap to a desired length.

17. The vehicle as set forth in claim 14 wherein the first strap includes a belt retractor configured to adjust the first strap to a desired length.

* * * * *